United States Patent [19]

Lilley

[11] 4,352,121
[45] Sep. 28, 1982

[54] PAL BURST PHASE SHIFT ERROR CORRECTOR

[75] Inventor: Martin A. Lilley, Fremont, Calif.

[73] Assignee: Ampex Corporation, Redwood City, Calif.

[21] Appl. No.: 138,464

[22] Filed: Apr. 8, 1980

[51] Int. Cl.³ ............................................ H04N 5/795
[52] U.S. Cl. ...................................... 358/326; 360/26
[58] Field of Search ................... 358/8, 18; 360/26, 36

[56] References Cited

U.S. PATENT DOCUMENTS 3,994,013  11/1976  Lemoine et al. ........................ 358/8
4,053,926  10/1977  Lemoine et al. ........................ 358/8
4,258,384  3/1981   Tatami ..................................... 358/8

Primary Examiner—Stuart N. Hecker
Attorney, Agent, or Firm—Donald L. Bartels; George B. Almeida; Joel D. Talcott

[57] ABSTRACT

Time base errors in PAL subcarrier reference bursts, created in part by the operation of a video tape recorder, are detected by the recorder and used for detecting the phase shift error in PAL phase angle switching between bursts on adjacent video signal lines which existed before the video signal was recorded. The video tape recorder timing errors detected on the PAL bursts are first detected after the 90° phase angle between successive PAL bursts has been eliminated. Two sample and hold units then are alternately strobed, each at a point in time during a given tape recorder head pass wherein the error signals are normally most accurate, such that a first burst timing error is retained in one such unit and a next burst timing error is retained in said second unit. The outputs of these two sample and hold units are filtered and combined in an integrator for generating a voltage control signal whose amplitude varies as a function of the pre-existing burst shift error. This control voltage is fed to a phase shift unit which operates in response thereto to modify the phase of subsequent off-tape color reference bursts before error detection has been performed on such subsequent bursts.

11 Claims, 7 Drawing Figures

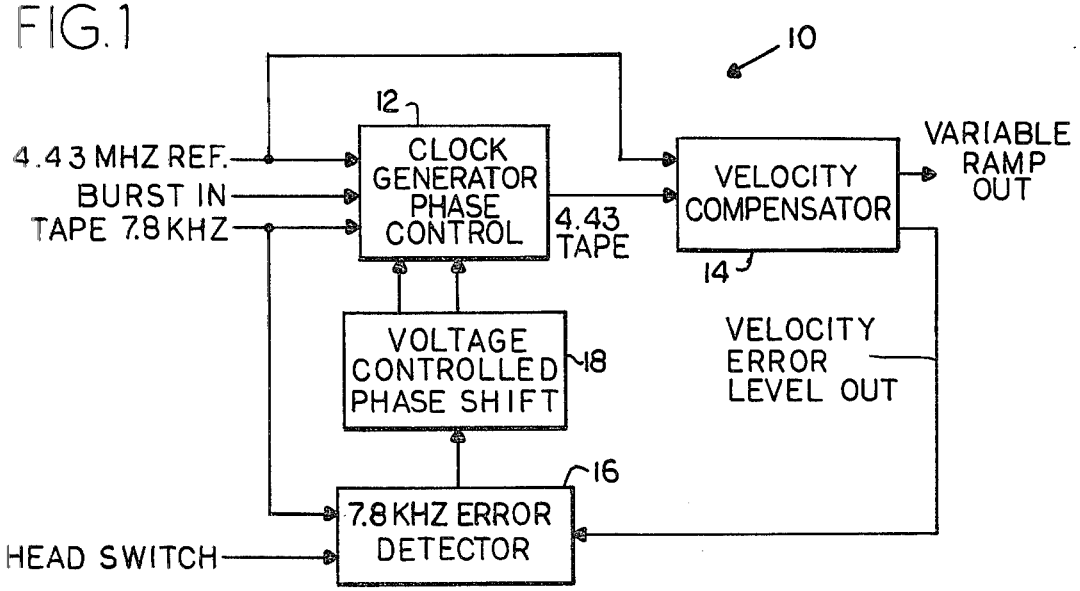
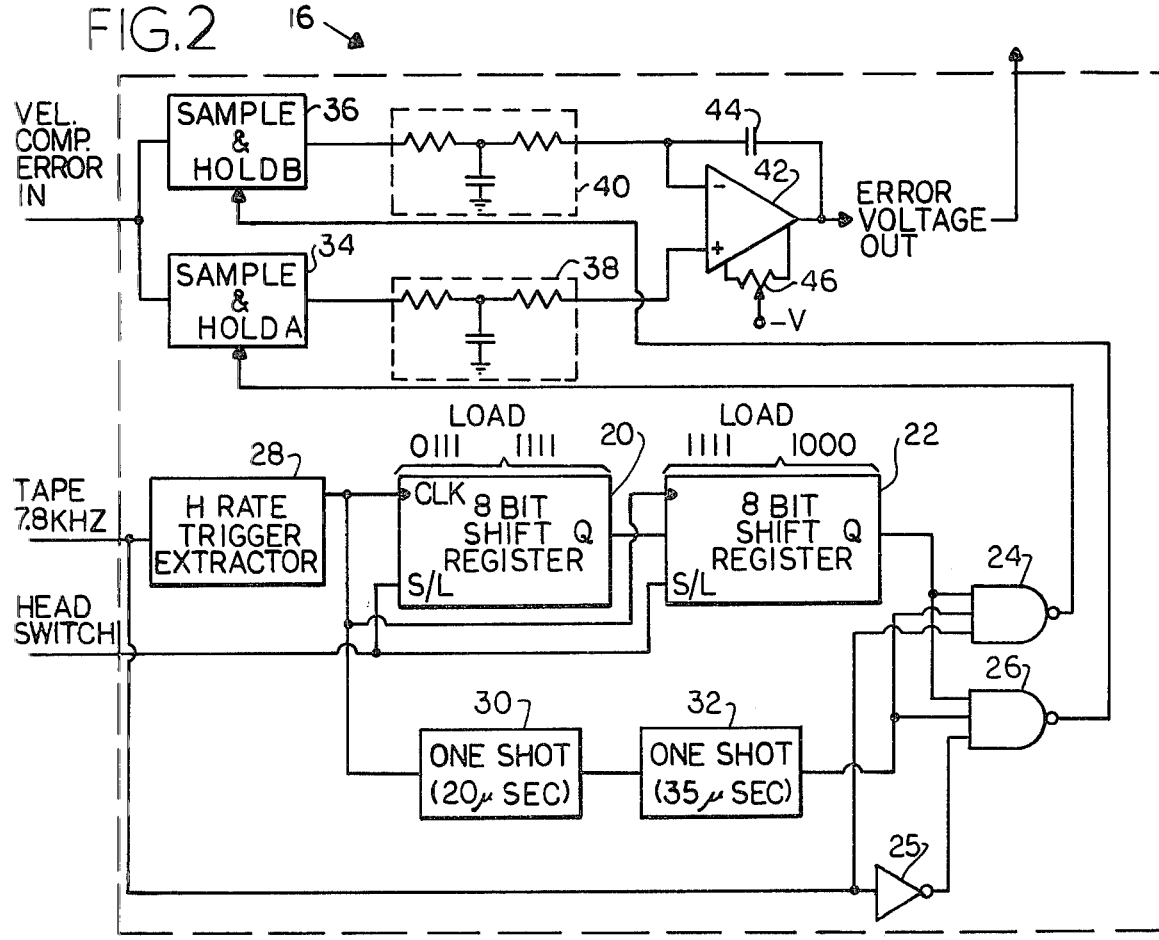

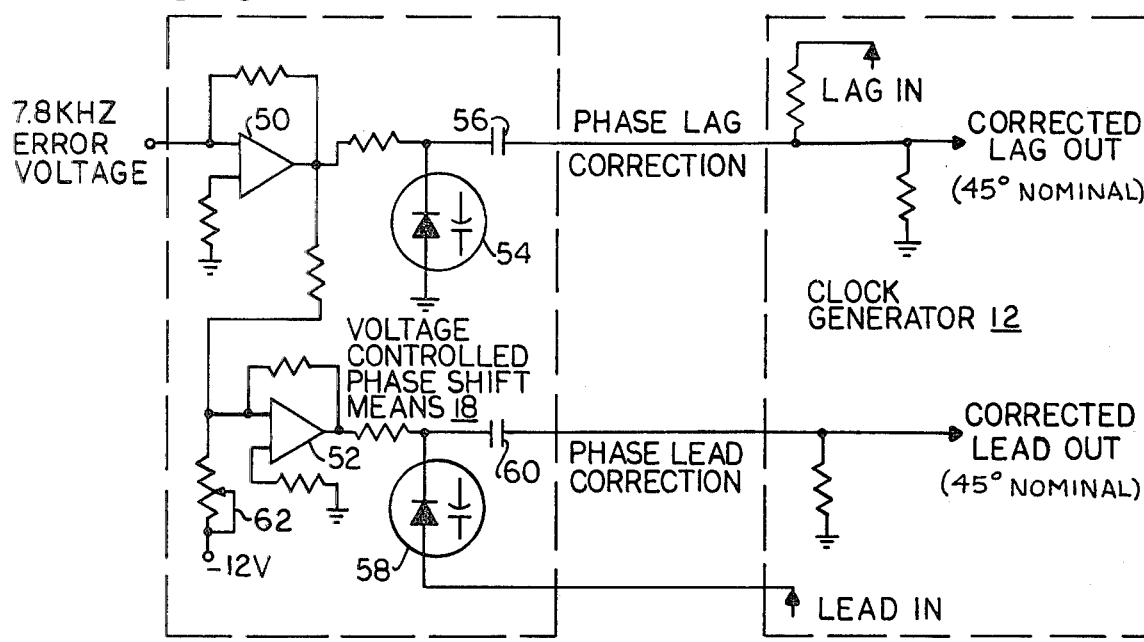
FIG. 3
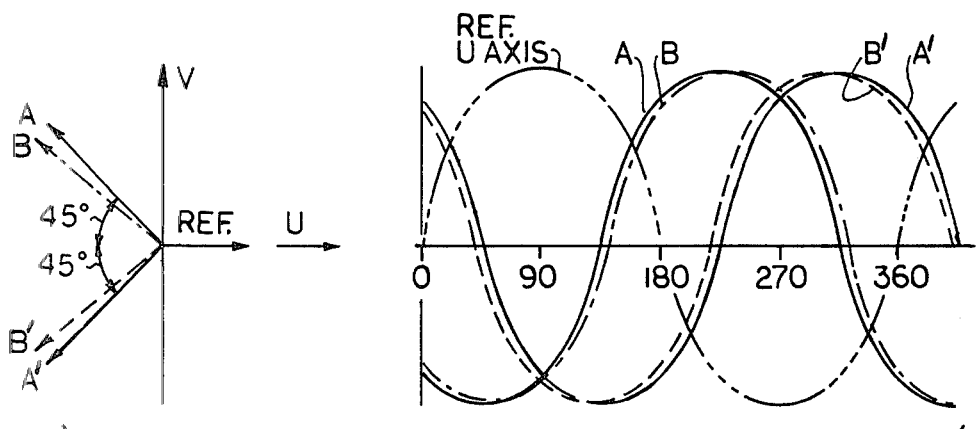
FIG. 4-A
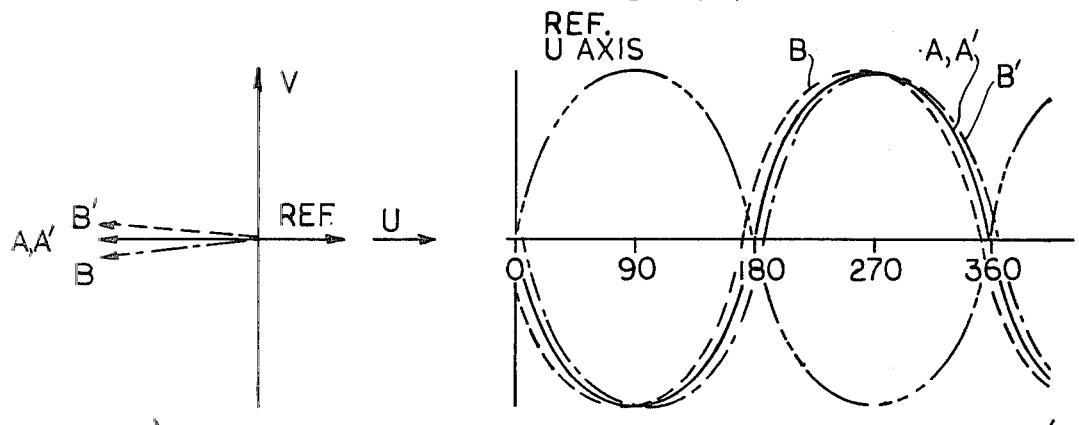
FIG. 4-B

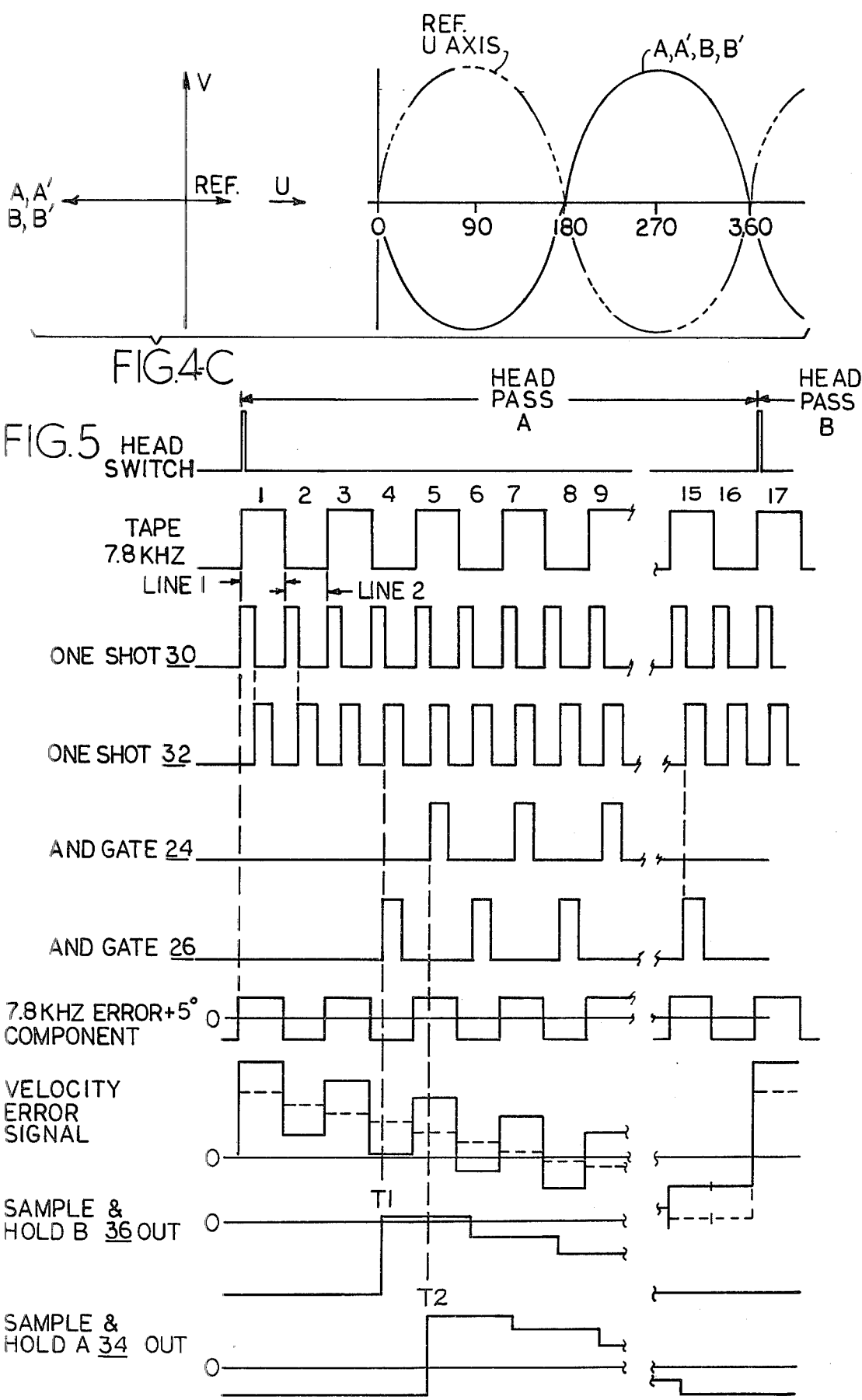

PAL BURST PHASE SHIFT ERROR CORRECTOR

The present invention relates generally to an apparatus and method for detecting and correcting non-video tape recorder induced phase shift errors between alternating PAL subcarrier color reference bursts, and more particularly to an improved apparatus and method of error correction wherein successive time base or velocity error signals are fed, in a closed loop, to a phase error detector whose output causes subsequent color bursts to be phase adjusted to eliminate such phase error.

Periodic or line by line organized information signals usually have periodically occurring synchronizing intervals, which ordinarily do not contain data information. Color television video signals are common examples of line by line organized information signals. Each horizontal line on a television video signal occurs with a frequency of 15.6 kHz, and has a line synchronizing pulse occurring at the beginning of the line. A sine wave burst of about 10 cycles in duration is also added for color television, of the subcarrier frequency of the color or chrominance signals, to provide a reference, a correct time base, for the subsequent demodulation of color information also appearing on the video signal during the duration of that given video line.

In normal operation, a receiver of such a video signal must have a local oscillator which operates not only at the same frequency as the frequency of this color subcarrier, but also in phase with it. Thus, the receiver picks out the 10 subcarrier reference burst cycles and its phase is compared with the phase of the local oscillator. Any difference in phase results in an output from a phase discriminator which is fed to a reactance transistor or variable capacitance (varactor) diode controlling the frequency of the local oscillator, thereby locking in the local oscillator to the mean phase of the subcarrier bursts and thus providing correct color demodulation. In a PAL television standard system (used mainly in Europe) the subcarrier reference burst for that line is generated 90° out of phase every other line.

In recording and subsequently reproducing information in a system having relatively moving record medium and transducers, time base errors commonly occur in the reproduced information. For example, in quadruplex or other video recorder and reproducer devices having rotary tape head transducers, information is recorded on and reproduced from separate tracks along the record medium and, when a plurality of transducers are employed, with switching occurring between the head transducers as successive tracks are swept. In such devices, head to tape time base errors have long been recognized and appropriate means provided for compensating for such errors.

In magnetic tape television recorder and reproducer devices, a number of heads, typically four, translate across a moving magnetic tape in a transverse, helical or arcuate manner to produce a series of non-continuous recorder tracks. Upon reproduction, the heads move in a similar fashion. As each head passes across the tape, it is switched into and out of the electronic signal processing channel. Quadruplex recorder and reproducer systems record the information in tracks transversly extending across a tape record medium, with each of the tracks containing several video lines of information. Each such line includes synchronizing information followed by data information, as described above. Coarse time base errors caused by the recording and reproducing process in the video recorder are typically corrected at the beginning of each horizontal line of the television signal.

Such time base correction does not, however, provide compensation for the effects of progressive time base errors that occur during each line. In color signal reproduction, this progressive time base error minifests itself as a change in hue across the television line. Because such errors are due to minute changes in the relative transducer to medium velocity, they are commonly referred to as velocity errors.

Velocity error compensation in reproducing recorded color television video signals commonly is performed on a line-by-line basis by comparing the phase of the color burst preceding the line to be corrected with the phase of the color burst preceding the next succeeding line, and then time base compensating these line occurring between the successive color bursts in accordance with the difference between the compared phases.

Such phase compensation is complicated in PAL standard systems (used mainly in Europe) wherein the color subcarrier reference burst on a given line is generated 90° out of phase with the next succeeding line. If this 90° were always exact, one need merely to eliminate this phase shift in alternate bursts before velocity error compensation is attempted. However, errors in the phase timing of successive color bursts which are generated prior to input of such signals to a video tape recorder, such as caused by an incorrect phase switching angle in bursts generated in the camera originating the video signal, or caused by some other deficiency in the video signal existing before it is fed into the video recorder, creates errors in the velocity compensator used by the video tape recorder to accurately reproduce the color burst and video data. Such PAL switching angle errors are indistinguishable from velocity errors to such a velocity compensator.

This additional error in an otherwise properly time base corrected burst is normally not detectable on a television screen, since the PAL system is designed to minimize the effect of such errors. That is, the error is on alternate lines, and alternate lines are color averaged together in the PAL system.

In multiple head transducer video recorders, however, during switching from one head to another during recorder playback, the PAL phase angle error becomes quite noticeable. The velocity error compensator assumes that the error on the last line on a given transducer is going to be the same as on the penultimate line, the next to the last line, and therefore repeats this error signal as measured on this penultimate line. By "last line," or "last period" is meant the last period of a signal reproduced by a transducer prior to the termination of signal reproduction by said transducer and recorder switching to a next transducer. The difficulty with this last line error correction procedure is that any error in the PAL burst not generated by the video recorder shows up as an easily seen error on the picture, since any phase angle switching error in adjacent 90° phase shifted bursts between the two lines in a PAL system are thereby added rather than averaged together. This error appears as a band of different color hue extending across the picture screen. A phase error of as little as 2° is discernable to the naked eye. Since the head transducers switch about 20 times in a given vertical frame or field, 20 such error hue bands may be clearly discernible.

A prior art PAL phase error compensator for eliminating banding at transducer switch times is known. This circuit had the disadvantage that it did not eliminate the phase error output by the recorder, nor did it differentiate between velocity error measurements which were better than others during a given period between transducer switchings, a head pass period. Usually 16 or 17 lines are recorded or reproduced during each head pass.

Therefore, an object of the present invention is to provide a closed loop PAL phase angle switching error compensator for eliminating burst phase shift errors between adjacent bursts.

Another object of the present invention is to provide a PAL phase shift error corrector which completes burst phase correction prior to detection and compensation by the recorder of velocity errors, thereby eliminating banding in last line velocity error correction.

A further object of the present invention is to sample velocity errors of lines for generation of PAL phase correction and to sample such errors only during the middle portion of a given head pass, when such errors are most accurately measured.

A still further object of the present invention is to sample the velocity error detected for a given line during the time of occurrence of the middle portion of that line, thereby sampling said error during the time said error is most likely to be accurate for that line.

These and other objects and advantages of the present invention will become more apparent upon reference to the following detailed description and the accompanying drawings, in which:

FIG. 1 is a block diagram of a PAL burst phase shift error corrector according to the present invention;

FIG. 2 is a detailed schematic and partial block diagram of the 7.8 kHz phase error detector according to the present invention;

FIG. 3 is a schematic diagram of the voltage controlled phase shift circuit according to the present invention;

FIGS. 4A, 4B and 4C illustrate PAL reference bursts with and without phase error; and FIG. 5 is a timing diagram of the operation of the 7.8 kHz phase error corrector of FIG. 1.

Broadly stated, the present invention is directed to an apparatus and method for eliminating phase error between alternating PAL subcarrier reference bursts in a time varying video signal reproduced from a record medium by a plurality of transducers. The invention includes first the removal of the PAL standard phase angle generated in alternating subcarrier bursts on successive video lines, and then sensing the line velocity error in said phase shifted bursts for each such line. A first sample and hold unit is provided for retaining velocity errors occurring on first alternate lines, and a second sample and hold unit is provided for retaining velocity errors occurring on opposite alternate lines. The outputs of these sample and hold units are fed through filters to an integrating amplifier which generates a signal whose level is a function of the PAL phase angle switching error, if any, detected between such alternating lines. Finally, the phase of the subcarrier bursts is adjusted as determined by this error signal, thereby eliminating said phase angle switching errors for such subsequent subcarrier bursts.

Disclosure of an exemplary multi-transducer video tape recorder and reproducer including velocity error compensation, and "last line" error compensation is given in U.S. Pat. No. 3,994,013, to Lemoine, et al., issued Nov. 23, 1976 and assigned to the assignee of the present invention. The relevant portions of this patent disclosure are incorporated herein by reference.

Referring now to FIG. 1, shown at 10 is a block diagram of a video recorder and reproducer time base compensator for color subcarrier reference bursts, including a PAL burst phase shift error corrector according to the present invention. As seen in FIG. 1, the color reference burst is fed to a clock generator phase control means 12 which, among other functions, normally eliminates the 90° switching angle existing between alternate subcarrier bursts on the PAL video signal. To ensure that the clock is generated at a proper phase, a 4.43 MHz reference subcarrier, a stable exact frequency reference signal source, is also fed to the clock generator for comparison with the frequency and phase of the color burst, and to enable the clock phase lock loop or its equivalent to be locked on to this frequency. A tape 7.8 kHz signal is also fed to the clock generator 12 to indicate the beginning of each line of information coming in on the video signal, since each line has a normal duration of one half of this tape 7.8 kHz period. Each line has a normal length of 63.5 μsec, a frequency of approximately 15.6 kHz. The frequency of occurrence of two lines is relevant, as described in more detail hereinbelow, since PAL burst phase angle switching errors repeat at this frequency.

The output of the clock generator 12 is fed to a velocity compensator means 14 which on a line by line basis, provides velocity error correction to the recorder line demodulator.

The velocity compensator 14 compares the phase of the 4.43 tape signal generated by clock generator 12 with the 4.43 MHz reference, and generates a voltage level indicative of the phase shift error between these two signals, such error representing the velocity error of the signal coming off the tape with respect to the reference signal. The velocity compensator 14 then takes this voltage level and generates a ramp which is used to slightly vary the clock used by the video tape recorder to demodulate the data from that particular line. On the last line of a given magnetic head transducer pass, also called a head pass, special velocity compensation is needed, as mentioned above.

The velocity error level is also output to a 7.8 kHz error detector 16 which, according to the present invention, acts to detect any phase shift between successive bursts which are periodic at a frequency of 7.8 kHz and are thus indicative of burst phase error generated outside of the video tape recorder.

This error detector 16 also has input to it a signal which occurs whenever switching has occurred between head transducers, indicating the start of a new head pass. This is used by logic in the error detector 16 as described below, to ensure that the velocity error level measured by the error detector 16, in obtaining the 7.8 kHz error component, is measured only during its most accurate period during a given head pass.

The output of this 7.8 kHz error detector is fed to a voltage controlled phase shift means 18 which takes the error component voltage level generated by the detector 16 and outputs a signal which changes the phase of subsequent bursts outputted from the clock generator phase control circuit 12. The 7.8 kHz phase error between such bursts is thereby reduced to 0°.

As can be clearly seen in FIG. 1, this 7.8 kHz error correction means is a closed loop system which enables relatively quick nulling out of any such phase errors. Correction after one to three television frames (on the order of milliseconds) is preferred. The present invention is designed to allow errors of up to plus or minus 15° from the standard 90° PAL phase shift to be corrected.

FIG. 4 illustrates a plurality of exemplary subcarrier reference bursts, including both bursts which include, and bursts which do no include, phase error in the PAL switching angle. For clarity, each wave is both indicated as a sinusoidal wave, and as a vector equivalent thereof. In this figure, a representation of true velocity phase errors is omitted for clarity.

Referring first to FIG. 4A, bursts which are correctly 90° apart are shown at A and A' and illustrated as solid lines. The dashed lines B and B' indicate bursts which are off by a slight switching angle from the bursts A and A'. As mentioned above, such phase errors are the result of badly adjusted PAL encoders, etc.

Perhaps as seen more clearly in the vector diagram in FIG. 4A, the vectors A and A' are correctly 90° phase shifted apart about the U chrominance axis. The U chrominance axis remains unchanged in its phase in the PAL system. The dashed B and B' vectors, however, can clearly be seen to have a phase shift angle between them of less than this specified 90°. It is this latter phase angle error which the method and apparatus according to the present invention is designed to detect and eliminate.

Referring now to FIG. 4B, this figure illustrates the normal output of the clock generator phase control 12 and an output from control 12 with 7.8 kHz error as in the prior art. As can be seen in FIG. 4B, the A and A' bursts now coincide exactly in phase. However, the B and B' bursts, having originally an incorrect PAL switching angle, are out of phase when this 90° switching angle is attempted to be eliminated by the control 12. The vector diagram of FIG. 4B also illustrates this phase error still existing between bursts B and B'.

FIG. 4C illustrates the A, A' and B, B' bursts after the 7.8 kHz phase error between the B and B' burst has been corrected according to the present invention. All vectors A, A', B and B' are now coincident.

Referring now to FIG. 2, the 7.8 kHz error detector 16 consists of two parts, alternate line sample and hold circuits and associated circuitry, and logic for determining the sample time of each of these sample and hold circuits. Since the velocity error signal is more accurate during the middle of a given head transducer pass, the logic in detector 16 produces sampling pulses only during the 12 of 16 or 17 lines which are closest to the center of a given head pass. This logic includes two 8-bit shift registers 20 and 22 which are loaded with parallel data of a configuration as shown, to generate a serial bit string output of 12 pulses out of 16 counts. The shift register 20 and 22 are reset and loaded with these parallel words on the occurrence of each head switch, indicating thereby the beginning of a new head pass. The serial data from each shift register 20 and 22 is clocked out to two AND gates 24 and 26 by a clock pulse generated from the tape 7.8 kHz signal. As mentioned above, the tape 7.8 kHz signal is an internally generated constant signal of the frequency equal to the time of occurrence of two lines of data. An H rate trigger extractor 28 takes and generates a narrow clock pulse upon the detection of each edge, the rising and the trailing edge of the tape 7.8 kHz signal. The H rate trigger extractor 28 thus generates a short clock pulse at a point in time which corresponds to the beginning of each line on the video signal. These narrow pulses are used to clock the shift registers 20, 22.

The H rate trigger extractor 28 clock pulse is also fed to a one shot 30 which is set to output a conventional pulse of 20 microseconds duration. At the end of this 20 microsecond period, one shot 30 goes off causing one shot 32 to go on. One shot 32 is set to have a time duration of 35 microseconds. The timing of each one shot 30 and 32 is set such that AND gates 24 and 26 are enabled during a period of time somewhere in the middle of a given horizontal line duration, each line normally having a total duration of 63.5 microseconds. Thus, sampling by the detector 16 of the velocity compensation error is done at the most accurate time during a given line duration. Finally, AND gate 24 is directly fed the tape 7.8 kHz signal and AND gate 24 an inverted tape 7.8 kHz signal, via invertor gate 25, thereby causing AND gate 24 and 26 to be alternately enabled. That is, during one line duration, AND gate 24 will be enabled, and during the next succeeding line, AND gate 26 is enabled.

The result is that this logic circuit generates an output pulse alternately out of AND gates 24 and 26, during the middle 12 lines of the 16 or 17 lines in a given head pass, with each such pulse having a duration of about 35 microseconds, and occurring approximately during the middle period of the duration of a given line.

The output pulses from AND gate 24 are fed to a conventional sample and hold means 34, identified as sample and hold unit A, and output pulses from AND gate 26 are fed to a conventional sample and hold means 36, identified as sample and hold unit B. These pulses are used respectively to alternately strobe the sample and hold means 34 and 36, such that a signal appearing on the input to either unit during such time is sampled and held by the sample and hold unit so strobed until a next strobe pulse is generated.

As seen in FIG. 2, the velocity error voltage level outputted by the velocity compensator 14 is fed to both sample and hold units A and B. Thus, each sample hold unit samples and retains this velocity compensator error at a point in time controlled by the pulses generated by AND gates 24 and 26.

The outputs from each of the sample and hold means 34 and 36 are fed through respective low pass filters 38 and 40, to smooth out these outputs. The outputs of filters 38 and 40 are both fed into a high gain differential amplifier 42 which acts as a integrator of these two signals, by virtue of the capacitor 44 connected in the feedback loop of amplifier 42.

Since sample and hold means 34 samples velocity errors only on a first series of lines, and sample and hold means 36 samples voltage errors on the next succeeding alternate lines, the output voltage from these means 34 and 36 are offset by the amplitude and polarity of any residual 7.8 kHz phase error signal which may exist on the velocity compensation error signal. Filters 38 and 40 provide a relatively long time constant for the outputs from each of the sample and hold units 34 and 36, and the amplifier 42 further integrates these outputs and combines then, generating an error voltage whose level varies as a function of the 7.8 kHz error component detected by this detector 16. Not that a variable resistor 46 is also provided on the differential amplifier 42 to provide an offset null means, to enable presetting the error voltage level output of amplifier 42 to approximately zero volts when no 7.8 kHz phase error is existing on successive bursts.

FIG. 3 illustrates a detailed schematic of a preferred embodiment of a voltage control phase shift means 18 according to the present invention. As seen in FIG. 3, the 7.8 kHz error voltage generated by the 7.8 kHz error detector 16 is fed to a conventional amplifier 50 and thereafter through a unity gain inverting amplifier 52. The output of amplifier 50 is used to correct any lag in the phase of a first burst, and the output of amplifier 52 is used to eliminate any phase lead in the next, or alternate line.

For the lag network, the output of amplifier 50 is fed to a voltage variable capacitor diode, a varactor diode 54 and a capacitor 56, and thereafter to the clock generator 12, for providing a phase error correction in PAL bursts of lag phase. Similarly, the output of amplifier 52 is fed to a varactor diode 58 and capacitor 60, and thereafter to the clock generator 12 to provide phase lead correction of the corresponding PAL bursts of lead phase. A variable resistor 62 provides means for adjusting chrominance phase relative to burst phase.

Operation of the 7.8 kHz phase error detector 16 of FIG. 1 is illustrated in the timing diagram shown in FIG. 5. FIG. 5 illustrates an exemplary head pass A, and a beginning of a second head pass B. Head pass A indicates the period of operation of a first head transducer, and head pass B indicates a partial period of operation of the next switched in head transducer. Head switch pulses are generated when the video recorder switches from one transducer to another, and are provided to the 7.8 kHz error detector 16 on the head switch line. As is seen, these signals are essentially very short strobe pulses occurring at the beginning of each head pass.

Also illustrated in FIG. 5 is the tape 7.8 kHz signal, which is merely a square wave whose frequency is 7.8 kHz, with each half phase of this signal being on for a time equal to the duration of a given line of video information. The time of occurrence of an exemplary line 1 and line 2 in head pass A are illustrated. The H rate trigger extractor 28 generates a strobe pulse on both the rising and trailing edges of the tape 7.8 kHz signal. This pulse is used to strobe on one shot 30, as shown. When one shot 30 goes off, it strobes on one shot 32, also as shown. Since the shift register 20 and 22 are loaded with 12 bits out of 16 when the head switch pulse is generated, it can be seen from the illustrated outputs of AND gates 24 and 26, that these shift registers prevent either AND gate from outputting a signal until the fourth line of the head pass is begun. Similarly, at the end of the head pass, it can be seen that the pulse that would normally be generated by AND gate 24 is eliminated, since this pulse, indicative of the last line of the head pass, is also not output by the shift registers 20, 22.

An exemplary 7.8 kHz error component is shown, with a phase angle switching error of +5° between adjacent bursts. Next is shown an exemplary velocity error signal, with the dotted levels indicating the voltage level of the velocity error signal without addition of the 7.8 kHz error component, and the solid line indicating the voltage level of the velocity error signal with the 7.8 kHz error component added thereto. Finally, FIG. 5 illustrates the operation of the two sample and hold units 34 and 36. Sample and hold 36 has a variation in its output level at time T1 corresponding to the time or occurrence of the first pulse out of AND gate 26. The new voltage level of the sample and hold 36 after time T1 is reflective of the level existing at that time of the velocity error signal, including and 7.8 kHz error component. Similarly, when the first AND gate 24 pulse is generated, at time T2, the sample and hold unit 34 changes state, also to a new state reflecting the level of the velocity error signal at that point in time. Subsequent changes in the output level of each sample and hold unit 34, 36 occur in a similar manner to the above.

It is of course understood that although a preferred embodiment of the present invention has been illustrated and described, various modification, alternatives and equivalents thereof will become apparent to those skilled in the art and, accordingly, the scope of the present invention should be defined only by the appended claims and equivalents thereof.

What is claimed is:

1. A method for eliminating phase error between alternating PAL subcarrier reference bursts in a time varying video signal reproduced from a record medium by a plurality of transducers, comprising the steps of:
   removing the 90° phase shift between subcarrier bursts on successive lines;
   sensing the line velocity error in said phase shifted bursts for each such line;
   sampling and retaining in a first unit said velocity error occurring on first alternate lines;
   sampling and retaining in a second unit said velocity error occurring on opposite alternate lines;
   combining the outputs from said first and second sampling and retaining units and generating therefrom a phase signal which is a function of any 7.8 kHz phase difference between such alternating lines; and
   adjusting the phase of said subcarrier bursts as a function of said phase signals to substantially remove any said 7.8 kHz phase difference.

2. The method of claim 1 further comprising the steps of determining the occurrence of at least the last line before switching from one transducer to another, and causing the respective sampling and retaining unit which would normally retain the velocity error occurring on said line to refrain from sampling said velocity error.

3. The method of claim 1 wherein said step of combining the outputs from said first and second sampling and retaining units comprises the step of filtering and integrating together said outputs and generating therefrom a voltage level signal varying as a function of any 7.8 kHz phase difference detected.

4. The method of claim 1 wherein the step of adjusting the phase of said subcarrier bursts comprises the step of modifying the capacitance of a variable capacitance component across which said subcarrier bursts are fed and prior to removal of said 90° phase shift.

5. A method for eliminating phase error between alternating PAL subcarrier reference bursts in a time varying video signal reproduced from a record medium by a plurality of transducers, comprising the steps of:
   removing the 90° phase shift between subcarrier bursts on successive lines;
   sensing the line velocity error in said phase shifted bursts for each such line;
   sampling and retaining in a first unit said velocity error occurring on first alternate lines;

sampling and retaining in a second unit said velocity error occurring on opposite alternate lines;

combining the outputs from said first and second sampling and retaining units and generating therefrom a phase signal which is a function of any 7.8 kHz phase difference between such alternating lines; and adjusting the phase of said subcarrier bursts as a function of said phase signals to substantially remove any said 7.8 kHz phase difference, said steps of sampling and retaining velocity errors during a given head transducer pass being limited to the sampling of velocity errors detected on a plurality of lines at the middle of the head pass.

6. The method of claim 5 wherein said plurality of lines sampled in each given head pass comprise twelve lines.

7. In a multi-transducer PAL television signal reproducing apparatus having a velocity compensator which produces discrete line by line correction signals for progressive time base errors, means for eliminating phase errors between adjacent subcarrier reference bursts comprising:

means for adjusting the phase of alternating bursts such that the standard PAL phase angle therein is removed;

means for measuring the phase difference between successive said adjusted bursts and for generating a velocity error signal as a function thereof;

first means for sampling and holding said velocity error signals in first alternate video lines;

second means for sampling and holding said velocity error signals in the next succeeding video lines;

means for generating a signal varying as a function of any variation between the outputs of said first and second sampling and holding means having a period equal to the time duration of two video lines; and means for modifying said velocity error signals as a function of said generated signal.

8. In an apparatus for reproducing video signals on a line by line basis previously recorded on a record medium using successive ones of a plurality of transducers between which switching occurs, said signals including subcarrier bursts, with bursts on alternate lines normally being out of phase a standard amount, and using velocity compensation to eliminate phase errors created by the recording or reproducing of said video signals, a means for eliminating phase errors existing between adjacent said bursts prior to said recording comprising:

means for adjusting the phase of alternating bursts such that said standard phase shift therein is removed;

means for measuring the phase difference between successive said adjusted bursts and for generating a velocity error signal as a function thereof;

first means for sampling and holding said velocity error signals in first alternate video lines;

second means for sampling and holding said velocity error signals in the next succeeding video lines;

means for generating a signal varying as a function of any variation between the outputs of said first and second sampling and holding means having a period equal to the time duration of two video lines; and means for modifying said velocity error signals as a function of said generated signal.

9. In an apparatus for reproducing video signals on a line by line basis previously recorded on a record medium using successive ones of a plurality of transducers between which switching occurs, said signals including subcarrier bursts, with bursts on alternate lines normally being out of phase a standard amount, and using velocity compensation to eliminate phase errors created by the recording or reproducing of said video signals, a means for eliminating phase errors existing between adjacent said bursts prior to said recording comprising:

means for adjusting the phase of alternating bursts such that said standard phase shift therein is removed;

means for measuring the phase difference between successive said adjusted bursts and for generating a velocity error signal as a function thereof;

first means for sampling and holding said velocity error signals in first alternate video lines;

second means for sampling and holding said velocity error signals in the next succeeding video lines;

means for generating a signal varying as a function of any variation between the outputs of said first and second sampling and holding means having a period equal to the time duration of two video lines; and means for modifying said velocity error signals as a function of said generated signal, said first and second means for sampling and holding velocity errors comprising:

shift register means, including means for loading a plurality of pulses into such shift register means at each transducer switching;

one shot means for generating a one shot pulse of predetermined duration occurring during the time duration of each video line;

means for generating a stobe pulse at the beginning of each video line, said shift register means acting in response thereto to shift to a next position, a successive shift register pulse being output by said shift register means thereby, said one shot means also activating in response thereto; and gate means for generating an output pulse on a first line as a function of the occurrence of said one shot pulse and said shift register pulse for first alternate video lines, and for generating an output pulse on a second line as a function of the occurrence of said one shot pulse and said shift register pulse for second alternate video lines;

said first sampling and holding means being strobed by said first line pulse, said second sampling and holding means being strobed by said second line pulse.

10. The apparatus of claim 9 wherein said means for modifying the phase shift of subsequent video lines as a function of said generated signal comprises variable capacitance means operatively connected to said means for adjusting the phase of alternating bursts, such that said generated signal causes the capacitance of said variable capacitance means to be modified as a function thereof, thereby modifying said phase shift.

11. A method for correction of errors in the 90° phase shift of subcarrier bursts between adjacent video lines of a time varying PAL video signal comprising the steps of:

detecting any variation in phase shift from the standard 90° phase shift between subcarrier bursts on successive lines of video;

sampling and retaining in a first unit said detected phase shift variation between first alternative successive subcarrier bursts;

sampling and retaining in a second unit said detected phase shift variation between second alternate successive subcarrier bursts;

generating an error signal representative of the difference in amplitude between said detected phase shift variation signal in said first unit and said detected phase shift variation signal in said second unit that is periodic at a frequency at one half the frequency of a single video line; and removing the 90° phase shift between successive subcarrier bursts including adjusting said removal as a function of said error signal, to substantially remove any such detected phase shift variation.

* * * * *